(12) United States Patent
Sorimachi et al.

(10) Patent No.: US 12,023,623 B2
(45) Date of Patent: Jul. 2, 2024

(54) ABSORPTION SOLVENT REGENERATION DEVICE, CO$_2$ RECOVERY DEVICE, AND ABSORPTION SOLVENT REGENERATION METHOD

(71) Applicant: MITSUBISHI HEAVY INDUSTRIES, LTD., Tokyo (JP)

(72) Inventors: Yoshiki Sorimachi, Kanagawa (JP); Takashi Kamijo, Kanagawa (JP); Shinya Kishimoto, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 395 days.

(21) Appl. No.: 17/439,241

(22) PCT Filed: Feb. 10, 2020

(86) PCT No.: PCT/JP2020/005139
§ 371 (c)(1),
(2) Date: Sep. 14, 2021

(87) PCT Pub. No.: WO2020/189094
PCT Pub. Date: Sep. 24, 2020

(65) Prior Publication Data
US 2022/0152550 A1  May 19, 2022

(30) Foreign Application Priority Data
Mar. 20, 2019 (JP) .................. 2019-052033

(51) Int. Cl.
*B01D 53/14* (2006.01)
*B01D 53/18* (2006.01)
*C01B 32/50* (2017.01)

(52) U.S. Cl.
CPC ...... *B01D 53/1425* (2013.01); *B01D 53/1418* (2013.01); *B01D 53/1475* (2013.01); *B01D 53/18* (2013.01); *C01B 32/50* (2017.08)

(58) Field of Classification Search
CPC ............ B01D 53/1425; B01D 53/1418; B01D 53/1475; B01D 53/18; B01D 2257/504;
(Continued)

(56) References Cited

U.S. PATENT DOCUMENTS

2007/0283813 A1  12/2007  Tijima et al.
2012/0118162 A1   5/2012  Ogawa et al.
(Continued)

FOREIGN PATENT DOCUMENTS

CN  103961979 A  8/2014
EP    2636440 A2  9/2013
(Continued)

OTHER PUBLICATIONS

The extended European Search Report dated Apr. 7, 2022, issued to the corresponding European Application No. 20773098.7 (9 pages).
(Continued)

*Primary Examiner* — Robert A Hopkins
*Assistant Examiner* — Qianping He
(74) *Attorney, Agent, or Firm* — Osha Bergman Watanabe & Burton LLP

(57) ABSTRACT

An absorption solvent regeneration device includes: a regenerator for regenerating an absorption solvent by separating CO$_2$ from the absorption solvent which has absorbed CO$_2$; a main rich solvent line for supplying the absorption solvent which has absorbed CO$_2$ to the regenerator; a first heating part for heating the absorption solvent flowing through the main rich solvent line, the first heating part being disposed on the main rich solvent line; and a branch rich solvent line for supplying a part of the absorption solvent flowing (Continued)

through the main rich solvent line to the regenerator, the branch rich solvent line branching from the main rich solvent line. The absorption solvent regeneration device further includes a regulating part for regulating a ratio between a first flow rate of the absorption solvent flowing through the first branch portion and a second flow rate of the absorption solvent flowing through the second branch portion.

15 Claims, 2 Drawing Sheets

(58) Field of Classification Search
CPC .... B01D 53/1412; B01D 53/62; B01D 53/14; C01B 32/50; Y02C 20/40
USPC .......................................................... 95/256
See application file for complete search history.

(56) References Cited

U.S. PATENT DOCUMENTS

| | | |
|---|---|---|
| 2012/0174783 A1 | 7/2012 | Leister et al. |
| 2013/0189174 A1* | 7/2013 | Iijima ................ B01D 53/1412 423/228 |
| 2013/0233015 A1* | 9/2013 | Kitamura ............... B01D 53/96 62/617 |
| 2014/0041523 A1* | 2/2014 | Tsujiuchi ................ C01B 32/50 96/218 |
| 2018/0117524 A1 | 5/2018 | Tsujiuchi et al. |

FOREIGN PATENT DOCUMENTS

| | | |
|---|---|---|
| JP | 2005-254212 A | 9/2005 |
| JP | 2012-020265 A | 2/2012 |
| JP | 2012-106180 A | 6/2012 |
| JP | 2014-501615 A | 1/2014 |
| JP | 2014-57941 A | 4/2014 |
| WO | 2018-083922 A1 | 5/2018 |

OTHER PUBLICATIONS

International Search Report of PCT/JP2020/005139 dated Apr. 30, 2020 (9 pages).
International Preliminary Report on Patentability mailed on Sep. 30, 2021 in corresponding International (PCT) Application No. PCT/JP2020/005139 (12 pages).
The Examination Report dated Jan. 3, 2022, issued in counterpart IN application No. 202117039390 (7 pages).

* cited by examiner

ABSORPTION SOLVENT REGENERATION DEVICE, $CO_2$ RECOVERY DEVICE, AND ABSORPTION SOLVENT REGENERATION METHOD

TECHNICAL FIELD

The present disclosure relates to an absorption solvent regeneration device, a $CO_2$ recovery device, and an absorption solvent regeneration method.

BACKGROUND

As a method for recovering $CO_2$ in flue gas produced by combustion of fuel or the like, a method has been proposed in which the flue gas and a $CO_2$ absorption solvent are brought into gas-liquid contact to recover $CO_2$ in the flue gas.

For example, Patent Document 1 discloses a $CO_2$ recovery device including an absorber and a regenerator. In the absorber, a $CO_2$-containing gas and an absorption solvent are brought into contact such that $CO_2$ is absorbed by the absorption solvent to remove $CO_2$ from the gas. The absorption solvent (rich solvent) which has absorbed $CO_2$ in the absorber is introduced to the regenerator and then heated with steam in a regeneration reboiler to remove $CO_2$ from the absorption solvent. The absorption solvent (lean solution) thus regenerated is returned to the absorber to be reused as the $CO_2$ absorption solvent.

Further, Patent Document 1 describes that part of the absorption solvent (rich solvent) from the absorber to the regenerator is branched, and the branched absorption solvent is heated by residual heat of steam condensate from the regeneration reboiler and then introduced to the regenerator. By using the residual heat of steam condensate used in the regeneration reboiler to heat the absorption solvent, the steam consumption required for regeneration of the absorption solvent (i.e., steam consumption in the regeneration reboiler) is reduced.

CITATION LIST

Patent Literature

Patent Document 1: JP2005-254212A

SUMMARY

Problems to be Solved

In the absorption solvent regeneration device including the absorber, a fluid derived from the absorption solvent and a fluid after heat exchange with the absorption solvent are sometimes extracted as a product and used in a facility. Such a fluid (e.g., product $CO_2$ or steam condensed water) obtained from the device is required to satisfy a predetermined temperature condition according to the application.

On the other hand, for example as in the device described in Patent Document 1, in the case of a device in which part of the absorption solvent (rich solvent) from the absorber to the regenerator is branched and led to the regenerator, the temperature at the top portion of the regenerator tends to rise. Accordingly, the temperature of the fluid (product $CO_2$) taken out of the device via the top portion of the regenerator tends to increase, and may exceed the temperature condition required for the product. In addition, since the temperature of the fluid obtained from the device can fluctuate due to changes in the operating condition (temperature, etc.) of the device, for example, when the temperature is high or low, it may not be possible to maintain the temperature of the fluid within an appropriate range. Otherwise, when the temperature condition required for the fluid obtained from the device is changed, the temperature of the fluid needs to be changed appropriately.

For these reasons, it is desirable to appropriately regulate the temperature of the fluid obtained from the device.

In view of the above, an object of at least one embodiment of the present invention is to provide an absorption solvent regeneration device, a $CO_2$ recovery device, and an absorption solvent regeneration method whereby it is possible to easily control the temperature of a fluid obtained from the absorption solvent regeneration device.

Solution to the Problems (1) An absorption solvent regeneration device according to at least one embodiment of the present invention comprises:

a regenerator for regenerating an absorption solvent by separating $CO_2$ from the absorption solvent which has absorbed $CO_2$; a main rich solvent line for supplying the absorption solvent which has absorbed $CO_2$ to the regenerator; a first heating part for heating the absorption solvent flowing through the main rich solvent line, the first heating part being disposed on the main rich solvent line; and a branch rich solvent line for supplying a part of the absorption solvent flowing through the main rich solvent line to the regenerator, the branch rich solvent line branching from the main rich solvent line. The branch rich solvent line includes: a first branch portion branching from a first branch point disposed on the main rich solvent line and upstream of the first heating part; and a second branch portion branching from a second branch point disposed on the main rich solvent line and downstream of the first heating part. The absorption solvent regeneration device further comprises a regulating part for regulating a ratio between a first flow rate of the absorption solvent flowing through the first branch portion and a second flow rate of the absorption solvent flowing through the second branch portion.

With the above configuration (1), since the ratio between the first flow rate of the absorption solvent with a relatively low temperature flowing through the first branch portion and the second flow rate of the absorption solvent with a relatively high temperature flowing through the second branch portion can be regulated, the temperature of the absorption solvent downstream of the junction point between the first branch portion and the second branch portion or the temperature of the absorption solvent in the main rich solvent line and downstream of the first heating part can be regulated.

Accordingly, the temperature of a fluid derived from the absorption solvent of the absorption solvent regeneration device or a fluid which exchanges heat with the absorption solvent in the absorption solvent regeneration device can be regulated. Thus, it is possible to regulate the temperature of the fluid obtained from the absorption solvent regeneration device within a desired range.

(2) In some embodiments, in the above configuration (1), the regulating part is configured to regulate a flow rate of the absorption solvent distributed from the main rich solvent line to the branch rich solvent line.

With the above configuration (2), in addition to that the ratio between the first flow rate and the second flow rate can be regulated as described above, the flow rate of the absorption solvent distributed from the main rich solvent line to the branch rich solvent line can be regulated, so the amount of heat exchange between the absorption solvent and a heating medium in the heat exchanger, etc., can be regulated more flexibly. Thus, it is possible to more flexibly regulate the temperature of the fluid obtained from the absorption solvent regeneration device.

(3) In some embodiments, in the above configuration (1) or (2), the regulating part includes at least one of a first valve, disposed on the first branch portion, for regulating the first flow rate or a second valve, disposed on the second branch portion, for regulating the second flow rate.

With the above configuration (3), since at least one of the first valve for regulating the first flow rate or the second valve for regulating the second flow rate is disposed, the ratio between the first flow rate and the second flow rate and the flow rate of the absorption solvent distributed from the main rich solvent line to the branch rich solvent line can be easily regulated.

For example, by regulating the flow rate in the first branch portion by the regulation of the first valve, the temperature of the absorption solvent having passed through the first heater (the absorption solvent in the second branch portion and downstream of the first heater of the main rich solvent line) can be appropriately regulated. Further, by regulating the first valve and/or the second valve, the flow rate of the absorption solvent flowing through respective portions of the main rich solvent line and the branch rich solvent line can be appropriately regulated.

(4) In some embodiments, in any one of the above configurations (1) to (3), the regulating part is configured to regulate the ratio between the first flow rate and the second flow rate such that a temperature of a tower top portion of the regenerator is within a specified range.

$CO_2$ gas released from the absorption solvent heated in the regenerator is recovered through the tower top portion of the regenerator as a product $CO_2$. In this regard, with the above configuration (4), since the ratio between the first flow rate and the second flow rate is regulated such that the temperature of the tower top portion of the regenerator is within a specified range, the temperature of the product $CO_2$ recovered from the absorption solvent regeneration device can be easily regulated within an appropriate range by setting this ratio appropriately.

(5) In some embodiments, in any one of the above configurations (1) to (4), the regulating part is configured to regulate the ratio between the first flow rate and the second flow rate such that a temperature of the absorption solvent in the main rich solvent line and downstream of the second branch portion is within a specified range.

The temperature of the absorption solvent in the main rich solvent line and downstream of the second branch portion may serve as an index of the temperature at the tower top portion of the regenerator, and the higher the temperature of the absorption solvent in the main rich solvent line, the higher the temperature at the tower top portion of the regenerator tends to be. In this regard, with the above configuration (5), since the ratio between the first flow rate and the second flow rate is regulated such that the temperature of the absorption solvent in the main rich solvent line and downstream of the second branch portion is within a specified range, the temperature of the product $CO_2$ recovered from the absorption solvent regeneration device can be easily regulated within an appropriate range by setting this ratio appropriately.

(6) In some embodiments, in any one of the above configurations (1) to (5), the branch rich solvent line includes a downstream portion which is a portion downstream of a junction point between the first branch portion and the second branch portion. The absorption solvent regeneration device further comprises: a regeneration reboiler for heating the absorption solvent extracted from the regenerator by heat exchange with steam; a steam line through which steam to be supplied to the regeneration reboiler flows; and a second heating part disposed on the steam line and configured to heat the absorption solvent flowing through the downstream portion by heat exchange with condensed water of steam after heating the absorption solvent in the regeneration reboiler. The regulating part is configured to regulate the ratio between the first flow rate and the second flow rate such that a temperature of the condensed water in the steam line and downstream of the second heating part is within a specified range.

Condensed water of steam after heating the absorption solvent in the regeneration reboiler may be used inside or outside the absorption solvent regeneration device. In this regard, with the above configuration (6), since the ratio between the first flow rate and the second flow rate is regulated such that the temperature of the condensed water in the steam line and downstream of the second heating part is within a specified range, the temperature of the steam condensed water obtained from the absorption solvent regeneration device can be easily regulated within an appropriate range by setting this ratio appropriately.

(7) In some embodiments, in any one of the above configurations (1) to (6), the branch rich solvent line includes a downstream portion which is a portion downstream of a junction point between the first branch portion and the second branch portion. The absorption solvent regeneration device further comprises: a regeneration reboiler for heating the absorption solvent extracted from the regenerator by heat exchange with steam; a steam line through which steam to be supplied to the regeneration reboiler flows; and a second heating part disposed on the steam line and configured to heat the absorption solvent flowing through the downstream portion by heat exchange with condensed water of steam after heating the absorption solvent in the regeneration reboiler. The regulating part is configured to regulate the ratio between the first flow rate and the second flow rate such that a temperature of the absorption solvent which is an upstream side more than the second heating part in the downstream portion is within a specified range.

The temperature of the absorption solvent which is an upstream side more than the second heating part in the downstream portion of the branch rich solvent line may serve as an index of the temperature of condensed water in the steam line and downstream of the second heating part, and the higher the temperature of the absorption solvent, the higher the temperature of condensed water in the steam line tends to be. In this regard, with the above configuration (7), since the ratio between the first flow rate and the second flow rate is regulated such that the temperature of the absorption solvent which is an upstream side more than the second heating part in the downstream portion of the branch rich solvent line is within a specified range, the temperature of the steam condensed water obtained from the absorption solvent regeneration device can be easily regulated within an appropriate range by setting this ratio appropriately.

(8) A $CO_2$ recovery device according to at least one embodiment of the present invention comprises: an absorber configured to cause $CO_2$ in a flue gas to be absorbed by an absorption solvent by bringing the flue gas containing $CO_2$ and the absorption solvent into contact; and the absorption solvent regeneration device described in any one of the above (1) to (7). The main rich solvent line is configured to supply the absorption solvent which has absorbed $CO_2$ in the absorber to the regenerator.

With the above configuration (8), since the ratio between the first flow rate of the absorption solvent with a relatively low temperature flowing through the first branch portion and the second flow rate of the absorption solvent with a relatively high temperature flowing through the second branch portion can be regulated, the temperature of the absorption solvent downstream of the junction point between the first branch portion and the second branch portion or the temperature of the absorption solvent in the main rich solvent line and downstream of the first heating part can be regulated.

Accordingly, the temperature of a fluid derived from the absorption solvent in the absorption solvent regeneration device or a fluid which exchanges heat with the absorption solvent in the absorption solvent regeneration device can be regulated. Thus, it is possible to regulate the temperature of the fluid obtained from the absorption solvent regeneration device within a desired range.

(9) An absorption solvent regeneration method according to at least one embodiment of the present invention comprises: a step of supplying an absorption solvent which has absorbed CO2 to a regenerator via a main rich solvent line; a step of regenerating the absorption solvent by separating CO2 from the absorption solvent in the regenerator; a step of heating the absorption solvent flowing through the main rich solvent line by a first heating part disposed on the main rich solvent line; and a step of distributing a part of the absorption solvent flowing through the main rich solvent line to a branch rich solvent line branching from the main rich solvent line. The step of distributing includes distributing a part of the absorption solvent to a first branch portion branching from a first branch point disposed on the main rich solvent line and upstream of the first heating part and a second branch portion branching from a second branch point disposed on the main rich solvent line and downstream of the first heating part. The absorption solvent regeneration method further comprising a regulating step of regulating a ratio between a first flow rate of the absorption solvent flowing through the first branch portion and a second flow rate of the absorption solvent flowing through the second branch portion.

With the above method (9), since the ratio between the first flow rate of the absorption solvent with a relatively low temperature flowing through the first branch portion and the second flow rate of the absorption solvent with a relatively high temperature flowing through the second branch portion can be regulated, the temperature of the absorption solvent downstream of the junction point between the first branch portion and the second branch portion or the temperature of the absorption solvent in the main rich solvent line and downstream of the first heating part can be regulated.

Accordingly, the temperature of a fluid derived from the absorption solvent of the absorption solvent regeneration device or a fluid which exchanges heat with the absorption solvent in the absorption solvent regeneration device can be regulated. Thus, it is possible to regulate the temperature of the fluid obtained from the absorption solvent regeneration device within a desired range.

(10) In some embodiments, in the above method (9), the regulating step includes regulating a flow rate of the absorption solvent distributed from the main rich solvent line to the branch rich solvent line.

With the above method (10), the flow rate of the absorption solvent distributed from the main rich solvent line to the branch rich solvent line can be regulated, so the amount of heat exchange between the absorption solvent and a fluid derived from the absorption solvent or a fluid which exchanges heat with the absorption solvent can be regulated more flexibly. Thus, it is possible to more flexibly regulate the temperature of the fluid obtained from the absorption solvent regeneration device.

(11) In some embodiments, in the above method (9) or (10), the regulating step includes regulating the first flow rate by a first valve disposed on the first branch portion or regulating the second flow rate by a second valve disposed on the second branch portion.

With the above method (11), since at least one of the first valve for regulating the first flow rate or the second valve for regulating the second flow rate is disposed, the ratio between the first flow rate and the second flow rate and the flow rate of the absorption solvent distributed from the main rich solvent line to the branch rich solvent line can be easily regulated.

For example, by regulating the flow rate in the first branch portion by the regulation of the first valve, the temperature of the absorption solvent having passed through the first heater (the absorption solvent in the second branch portion and downstream of the first heater of the main rich solvent line) can be appropriately regulated. Further, by regulating the first valve and/or the second valve, the flow rate of the absorption solvent flowing through respective portions of the main rich solvent line and the branch rich solvent line can be appropriately regulated.

(12) In some embodiments, in any one of the above methods (9) to (11), the regulating step includes regulating the ratio between the first flow rate and the second flow rate such that a temperature of a tower top portion of the regenerator is within a specified range.

$CO_2$ gas released from the absorption solvent heated in the regenerator is recovered through the tower top portion of the regenerator as a product $CO_2$. In this regard, with the above method (12), since the ratio between the first flow rate and the second flow rate is regulated such that the temperature of the tower top portion of the regenerator is within a specified range, the temperature of the product $CO_2$ recovered from the absorption solvent regeneration device can be easily regulated within an appropriate range by setting this ratio appropriately.

(13) In some embodiments, in any one of the above methods (9) to (12), the regulating step includes regulating the ratio between the first flow rate and the second flow rate such that a temperature of the absorption solvent in the main rich solvent line and downstream of the second branch portion is within a specified range.

The temperature of the absorption solvent in the main rich solvent line and downstream of the second branch portion may serve as an index of the temperature at the tower top portion of the regenerator, and the higher the temperature of the absorption solvent in the main rich solvent line, the higher the temperature at the tower top portion of the regenerator tends to be. In this regard, with the above method (13), since the ratio between the first flow rate and the second flow rate is regulated such that the temperature of the absorption solvent in the main rich solvent line and downstream of the second branch portion is within a specified range, the temperature of the product $CO_2$ recovered from the absorption solvent regeneration device can be easily regulated within an appropriate range by setting this ratio appropriately.

(14) In some embodiments, in any one of the above methods (9) to (13), the branch rich solvent line includes a downstream portion which is a portion downstream of a junction point between the first branch portion and the second branch portion. The absorption solvent regeneration method further comprises: a step of extracting the absorption solvent from the regenerator and heating the absorption solvent by heat exchange with steam in a regeneration reboiler; a step of supplying the steam to the regeneration reboiler via a steam line; and a step of heating, in a second heating part disposed on the steam line, the absorption solvent flowing through the downstream portion by heat exchange with condensed water of steam after heating the absorption solvent in the regeneration reboiler. The regulating step includes regulating the ratio between the first flow rate and the second flow rate such that a temperature of the condensed water in the steam line and downstream of the second heating part is within a specified range.

Condensed water of steam after heating the absorption solvent in the regeneration reboiler may be used inside or outside the absorption solvent regeneration device. In this regard, with the above method (14), since the ratio between the first flow rate and the second flow rate is regulated such that the temperature of the condensed water in the steam line and downstream of the second heating part is within a specified range, the temperature of the steam condensed water obtained from the absorption solvent regeneration device can be easily regulated within an appropriate range by setting this ratio appropriately.

(15) In some embodiments, in any one of the above methods (9) to (14), the branch rich solvent line includes a downstream portion which is a portion downstream of a junction point between the first branch portion and the second branch portion. The absorption solvent regeneration method further comprises: a step of extracting the absorption solvent from the regenerator and heating the absorption solvent by heat exchange with steam in a regeneration reboiler; a step of supplying the steam to the regeneration reboiler via a steam line; and a step of heating, in a second heating part disposed on the steam line, the absorption solvent flowing through the downstream portion by heat exchange with condensed water of steam after heating the absorption solvent in the regeneration reboiler. The regulating step includes regulating the ratio between the first flow rate and the second flow rate such that a temperature of the absorption solvent which is an upstream side more than the second heating part in the downstream portion is within a specified range.

The temperature of the absorption solvent which is an upstream side more than the second heating part in the downstream portion of the branch rich solvent line may serve as an index of the temperature of condensed water in the steam line and downstream of the second heating part, and the higher the temperature of the absorption solvent, the higher the temperature of condensed water in the steam line tends to be. In this regard, with the above method (15), since the ratio between the first flow rate and the second flow rate is regulated such that the temperature of the absorption solvent which is an upstream side more than the second heating part in the downstream portion of the branch rich solvent line is within a specified range, the temperature of the steam condensed water obtained from the absorption solvent regeneration device can be easily regulated within an appropriate range by setting this ratio appropriately.

Advantageous Effects

At least one embodiment of the present invention provides an absorption solvent regeneration device, a $CO_2$ recovery device, and an absorption solvent regeneration method whereby it is possible to easily control the temperature of a fluid obtained from the absorption solvent regeneration device.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
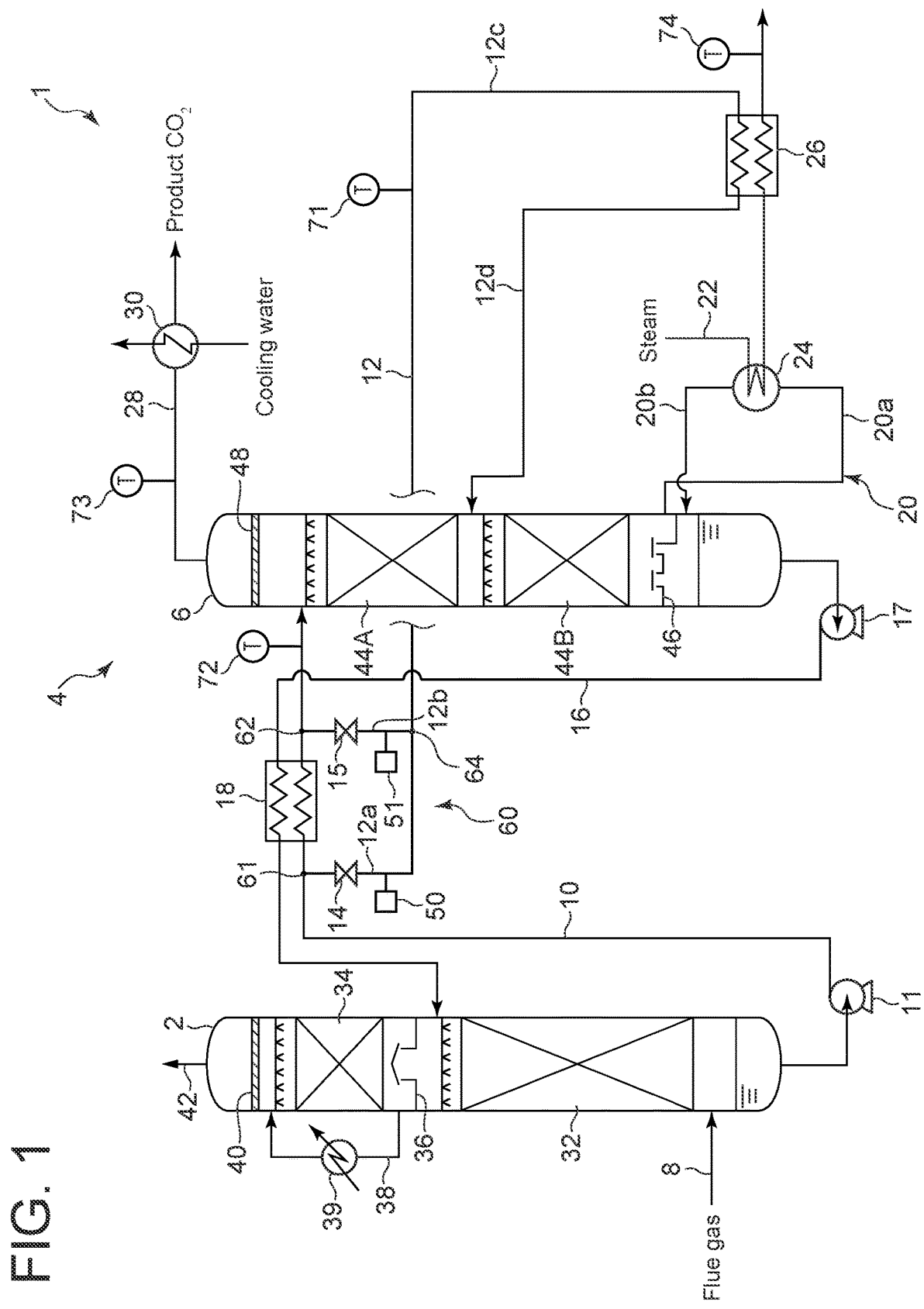
FIG. 1 is a schematic diagram of a $CO_2$ recovery device including an absorption solvent regeneration device according to an embodiment.
Figure 2:
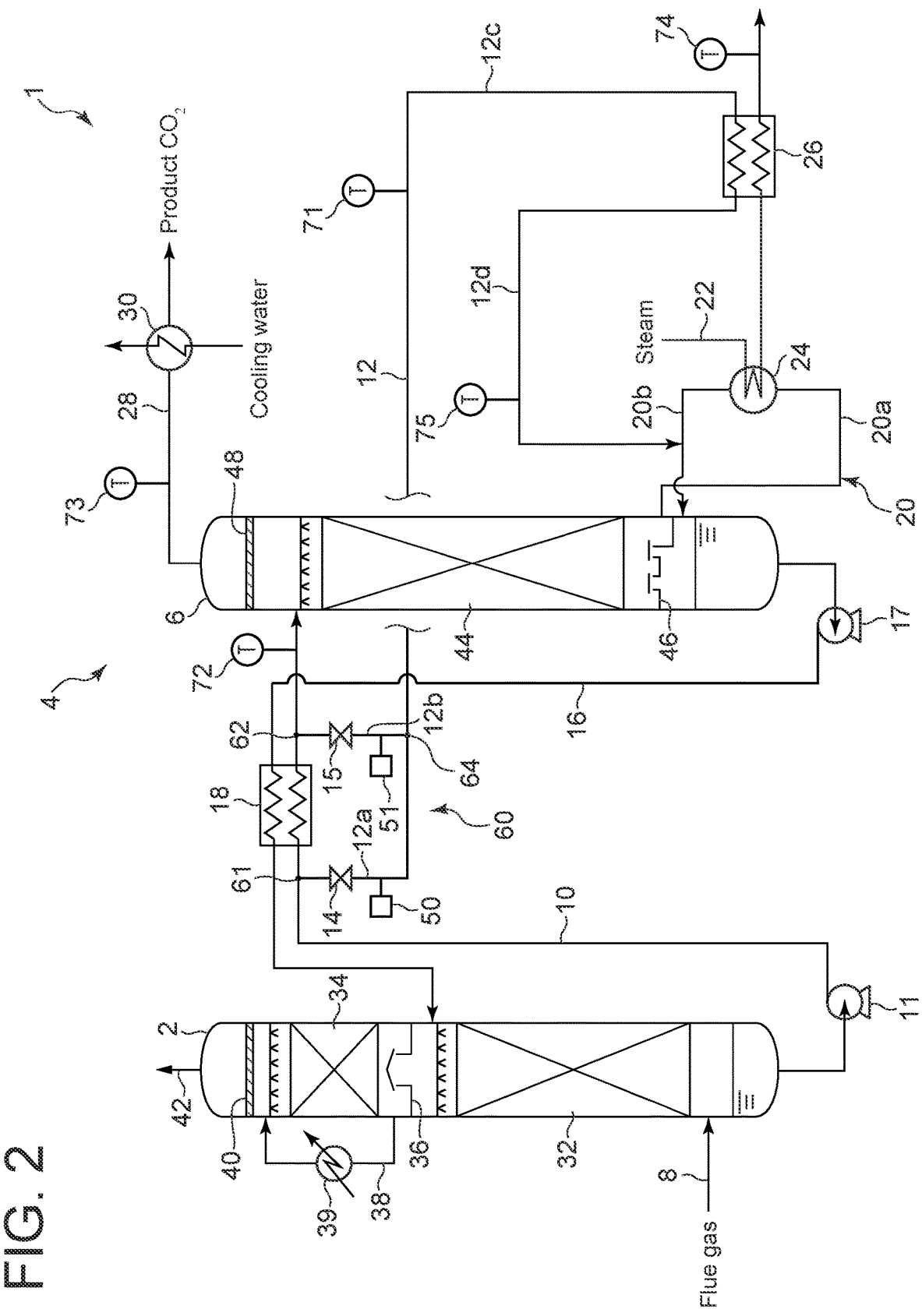
FIG. 2 is a schematic diagram of a $CO_2$ recovery device including an absorption solvent regeneration device according to an embodiment.

FIGS. 1 and 2 are each a schematic diagram of a $CO_2$ recovery device including an absorption solvent regeneration device according to an embodiment of the present invention. The $CO_2$ recovery apparatus shown in FIGS. 1 and 2 is a device for recovering $CO_2$ from exhaust gas discharged from a power generation facility, a plant, or the like. As illustrated in the drawing, the $CO_2$ recovery device 1 includes an absorber 2 for causing $CO_2$ in the flue gas to be absorbed in an absorption solvent, and an absorption solvent regeneration device 4 including a regenerator 6 for regenerating the absorption solvent which has absorbed $CO_2$ in the absorber 2. The absorption solvent regeneration device 4 includes a main rich solvent line 10 disposed between the absorber 2 and the regenerator 6, a regeneration reboiler (reboiler) 24 for heating the absorption solvent stored in the regenerator 6, and a reboiler line 20 configured to introduce the absorption solvent stored in the regenerator 6 to the regeneration reboiler 24.

Flue gas from a plant or the like is introduced to the absorber 2 via a flue gas introduction line 8. Flue gas from a plant or the like may be introduced to the absorber 2 after pre-treatment such as sulfur removal and cooling.

The absorber 2 includes an absorbing section 32 for absorbing $CO_2$ gas in the flue gas, a washing section 34 for washing the flue gas from which the $CO_2$ gas has been removed, and a demister 40, disposed above the washing section 34, for removing mist in the flue gas.

The absorbing section 32 is supplied with the absorption solvent (lean solvent) stored in the tower bottom portion of the regenerator 6 via a lean solvent line 16. The lean solvent line 16 is provided with a lean solvent pump 17 for pumping the lean solvent. The flue gas entering the absorber 2 through the flue gas introduction line 8 flows upward in the absorber 2 from the bottom portion side of the absorber 2, flows into the absorbing section 32, and comes into countercurrent contact in the absorbing section 32 with the absorption solvent (lean solvent) supplied from above the absorbing section 32. As a result, $CO_2$ in the flue gas is absorbed by the absorption solvent, and $CO_2$ is separated and removed from the flue gas. The absorbing section 32 may be formed by a packed layer packed with a packing material made of any material.

The absorption solvent is a liquid containing a $CO_2$ absorption agent. Although the type of $CO_2$ absorption agent is not limited, amines such as alkanolamines represented by monoethanolamine and diethanolamine, and various alkaline solutions other than amines such as sodium hydroxide, potassium hydroxide, and calcium hydroxide can be used as the $CO_2$ absorption agent.

The absorption solvent which has absorbed $CO_2$ from the flue gas in the absorbing section 32 descends to the bottom portion of the absorber 2 and is stored in the tower bottom portion. The absorption solvent stored in the bottom portion of the absorber 2 is a rich solvent having a higher $CO_2$ concentration than the absorption solvent (lean solvent) stored in the bottom portion of the regenerator 6, described later.

The washing section 34 is configured to wash the flue gas in order to recover the $CO_2$ absorption agent contained in the flue gas after removal of $CO_2$. The washing section 34 is supplied with washing water from a circulation line 38 from above. When the flue gas after removal of $CO_2$ comes into contact with the washing water in the washing section 34, the $CO_2$ recovery agent contained in the flue gas is dissolved in the washing water and thus can be recovered. Below the washing section 34, a chimney tray 36 is disposed. The washing water which has descended from the washing section 34 and stored in the chimney tray 36 is circulated through the circulation line 38 by a circulation pump 39 and is again supplied to the washing section 34 from above the washing section 34.

The flue gas from which the $CO_2$ absorption agent has been removed passes through the demister 40 disposed above the washing section 34, where the mist in the flue gas is captured. The flue gas deprived of mist is discharged outside from the tower top portion 42 of the absorber 2.

The absorption solvent (rich solvent) stored in the bottom portion of the absorber 2 is supplied from the absorber 2 to the regenerator 6 via a main rich solvent line 10. The main rich solvent line 10 is provided with a rich solvent pump 11 for pumping the rich solvent from the bottom portion of the absorber 2 to the regenerator 6. Further, a first heat exchanger 18 (first heating part) is disposed in the main rich solvent line 10 to exchange heat between the rich solvent flowing in the main rich solvent line 10 and the absorption solvent (lean solvent) flowing in a lean solvent line 16, which will be described later. By heating the rich solvent through heat exchange with the lean solvent of relatively high temperature in the first heat exchanger 18, it is possible to promote the regeneration of the absorption solvent in the regenerator 6 described below.

The regenerator 6 includes a release section 44 for releasing $CO_2$ gas from the rich solvent, and a chimney tray 46 disposed below the release section 44. The release section 44 has a packing material and is supplied with the absorption solvent (rich solvent) from the main rich solvent line 10 from above. In the embodiment shown in FIG. 1, the release section 44 includes a first release section 44A and a second release section 44B disposed below the first release section 44A.

In the release section 44, the rich solvent supplied as described above is heated by saturated steam supplied from a regeneration reboiler 24 to release the $CO_2$ gas, so that the absorption solvent (lean solvent) with relatively low $CO_2$ content is obtained. The lean solvent that drops from the release section 44 is received by the chimney tray 46.

The $CO_2$ gas released from the rich solvent in the release section 44 rises upward in the regenerator 6 toward the top of the release section 44, and after mist in the gas is captured by a demister 48, the gas is discharged from the regenerator 6 through a recovery line 28 connected to the top portion of the regenerator 6. The recovery line 28 is provided with a condenser 30. The condenser 30 is configured to cool the $CO_2$ gas discharged from the regenerator 6 by heat exchange with cooling water to condense moisture contained in the $CO_2$ gas. The $CO_2$ gas thus separated from moisture is recovered as a product. A gas-liquid separator (not shown) may be disposed downstream of the condenser 30 in the recovery line 28 to separate the $CO_2$ gas from the condensate.

The regenerator 6 is connected to a reboiler line 20 with a regeneration reboiler 24. The reboiler line 20 is configured to extract the absorption solvent stored in the regenerator 6 and return it to the regenerator 6 via the regeneration reboiler 24. The regeneration reboiler 24 is configured to heat the absorption solvent (lean solvent) introduced through the reboiler line 20, by heat exchange with a heating medium. The regeneration reboiler 24 is supplied with steam as the heating medium via a steam line 22.

The lean solvent received by the chimney tray 46 in the regenerator 6 is extracted from the regenerator 6 via a reboiler inlet line 20a of the reboiler line 20 and is introduced to the regeneration reboiler 24. In the regeneration reboiler 24, the lean solvent from the reboiler inlet line 20a is heated by heat exchange with steam from the steam line 22.

The lean solvent heated in the regeneration reboiler 24 at least partially changes its phase to saturated vapor and is discharged to the reboiler outlet line 20b of the reboiler line 20 in a gas-liquid multiphase state. The absorption solvent (lean solvent) discharged from the regeneration reboiler 24 is returned to the regenerator 6 via the reboiler outlet line 20b, more specifically, it is introduced to the bottom portion (below the chimney tray 46) of the regenerator 6 via the reboiler outlet line 20b.

The saturated steam introduced to the bottom portion of the regenerator 6 via the reboiler outlet line 20b raises in the regenerator 6 through the chimney tray 46, and is used to heat the rich solvent in the release section 44 to release $CO_2$ contained in the rich solvent, as described above.

On the other hand, the lean solvent introduced to the bottom portion of the regenerator 6 via the reboiler outlet line 20b (i.e., lean solvent that does not change phase in the regeneration reboiler 24) is stored in the bottom portion of the regenerator 6. This lean solvent is extracted from the bottom portion of the regenerator 6 via the lean solvent line 16 and is supplied to the absorbing section 32 of the absorber 2 by the lean solvent pump 17 disposed in the lean solvent line 16. The lean solvent thus returned to the absorber 2 is reused as the absorption solvent for absorbing $CO_2$ contained in the flue gas in the absorbing section 32. The lean solvent flowing in the lean solvent line 16 is cooled at the first heat exchanger 18 by heat exchange with the rich solvent flowing in the main rich solvent line 10.

The absorption solvent regeneration device 4 further includes a branch rich solvent line 12 branching from the main rich solvent line 10. The branch rich solvent line 12 is configured to supply part of the absorption solvent (rich solvent) flowing through the main rich solvent line 10 to the regenerator 6.

The branch rich solvent line 12 includes a first branch portion 12a branching from a first branch point 61 disposed on the main rich solvent line 10 and upstream of the first heat exchanger 18 (first heating part) and a second branch portion 12b branching from a second branch point 62 disposed on the main rich solvent line 10 and downstream of the first heat exchanger 18. Further, the branch rich solvent line 12 includes a downstream portion 12c which is a portion downstream of a junction point 64 between the first branch portion 12a and the second branch portion 12b.

Since the first branch portion 12a is branched off from the main rich solvent line 10 at a position upstream of the first heat exchanger 18, the absorption solvent that has not been heated by the first heat exchanger 18 flows into the first branch portion 12a. On the other hand, since the second branch portion 12b is branched off from the main rich solvent line 10 at a position downstream of the first heat exchanger 18, the absorption solvent that has been heated by the first heat exchanger 18 flows into the second branch portion 12b. Therefore, the temperature of the absorption solvent flowing through the second branch portion 12b is higher than the temperature of the absorption solvent flowing through the first branch portion.

In the exemplary embodiment shown in FIG. 1, the downstream portion 12c of the branch rich solvent line 12 is connected to the regenerator 6, and the absorption solvent (rich solvent) from the downstream portion 12c is supplied to an upper portion of the second release section 44B. The absorption solvent thus supplied to the second release section 44B is heated with saturated steam from the regeneration reboiler 24 as with the absorption solvent supplied from the main rich solvent line 10 to the release sections 44A, 44B.

In the exemplary embodiment shown in FIG. 2, the downstream portion 12c of the branch rich solvent line 12 is connected to the reboiler outlet line 20b. The absorption solvent (rich solvent) entering the reboiler outlet line 20b via the downstream portion 12c joins the absorption solvent (lean solvent) discharged from the regeneration reboiler 24 to the reboiler outlet line 20b and flows into the tower bottom portion of the regenerator 6.

In the absorption solvent regeneration device 4 shown in FIGS. 1 and 2, a second heat exchanger 26 (second heating part) is disposed on the steam line 22 through which steam supplied to the regeneration reboiler 24 flows. The second heat exchanger 26 is configured to exchange heat between the absorption solvent flowing through the downstream portion 12c of the branch rich solvent line 12 and condensed water of steam after heating the absorption solvent in the regeneration reboiler 24. Thus, the absorption solvent flowing through the downstream portion 12c is heated.

The steam condensed water introduced to the second heat exchanger 26 via the steam line 22 is cooled by heat exchange with the absorption solvent and then is discharged from the second heat exchanger 26. The steam condensed water thus discharged from the second heat exchanger 26 is supplied to and used in a facility such as a boiler.

The absorption solvent regeneration device 4 further includes a regulating part 60 for regulating a ratio between the first flow rate of the absorption solvent (rich solvent) flowing through the first branch portion 12a and the second flow rate of the absorption solvent (rich solvent) flowing through the second branch portion 12b.

In the exemplary embodiments shown in FIGS. 1 and 2, the regulating part 60 includes a first valve 14 disposed in the first branch portion 12a and a second valve 15 disposed in the second branch portion 12b. The first valve 14 is configured to regulate the first flow rate of the absorption solvent flowing through the first branch portion 12a. The second valve 15 is configured to regulate the second flow rate of the absorption solvent flowing through the second branch portion 12b.

In some embodiments, in the absorption solvent regeneration device 4, only one of the first valve 14 or the second valve 15 may be disposed.

The first branch portion 12a may be provided with a flow rate sensor 50 for measuring the flow rate of the absorption solvent in the first branch portion 12a. The second branch portion 12b may be provided with a flow rate sensor 51 for measuring the flow rate of the absorption solvent in the second branch portion 12b.

The regulating part 60 may include a controller (not shown) configured to control the opening degree of the first valve 14 and/or the second valve 15. Alternatively, the opening degree of the first valve 14 and/or the second valve 15 may be controlled by manual operation.

The controller may be configured to control the opening degree of the first valve 14 and/or the second valve 15 based on a measurement result of the flow rate sensor 50, 51. Further, the controller may be configured to control the opening degree of the first valve 14 and/or the second valve 15 based on a measurement result of temperature sensors 71 to 75 disposed at predetermined positions of the absorption solvent regeneration device 4.

As already described, in the absorption solvent regeneration device 4, a fluid derived from the absorption solvent and a fluid after heat exchange with the absorption solvent can be recovered as a product and used in a facility. For example, as described above, $CO_2$ gas (fluid derived from the absorption solvent) released from the absorption solvent in the regenerator 6 is recovered as a product $CO_2$ via the recovery line 28 connected to the tower top portion of the regenerator 6. Meanwhile, condensed water of steam having passed through the regeneration reboiler 24 in the steam line 22 (fluid after heat exchange with the absorption solvent) is used in a facility such as a boiler after heat exchange in the second heat exchanger 26 with the absorption solvent flowing through the downstream portion 12c. Such product $CO_2$ and steam condensed water obtained from the absorption solvent regeneration device 4 are required to satisfy a predetermined temperature condition according to the application.

On the other hand, as in the absorption solvent regeneration device 4 shown in FIG. 1 or FIG. 2, in the case of a device in which part of the absorption solvent (rich solvent) from the absorber 2 to the regenerator 6 is branched and led to the regenerator 6, the temperature at the top portion of the absorber may rise.

For example, in the absorption solvent regeneration device 4 shown in FIG. 1 or 2, the higher the branch flow rate from the position upstream of the first heat exchanger 18 in the main rich solvent line 10 (the first flow rate of the absorption solvent in the first branch portion 12a), the less absorption solvent (rich solvent) is supplied to the first heat exchanger 18. Accordingly, the temperature downstream of the first heat exchanger 18 in the main rich solvent line 10 rises, and the rich solvent with the raised temperature is supplied to the regenerator 6 via the main rich solvent line 10. Here, since the temperature at the tower top portion of the regenerator 6 depends on the temperature of the rich solvent supplied via the main rich solvent line 10, the temperature at the tower top portion of the regenerator 6 increases. Accordingly, the temperature of product $CO_2$ recovered via the tower top portion of the regenerator 6 and the recovery line 28 also increases, and may exceed the temperature condition required for the product.

In addition, since the temperature of the fluid obtained from the device can fluctuate due to changes in the operating condition (temperature, etc.) of the device, it may not be possible to maintain the temperature of the fluid within an appropriate range.

For example, the temperature of cooling water supplied to the condenser 30 disposed on the recovery line 28 fluctuates with the seasons. The temperature of cooling water is higher in summer at high temperature and is lower in winter at low temperature. Further, since the temperature of $CO_2$ gas cooled in the condenser 30 is affected by the cooling water temperature, if the cooling water temperature is too high or too low, the temperature of $CO_2$ recovered after passing through the condenser 30 may deviate from the temperature condition.

Otherwise, the temperature of steam condensed water from the second heat exchanger 26 may need to be changed when there is a change in the configuration of the facility (e.g., boiler) to which the steam condensed water is supplied.

In this regard, with the absorption solvent regeneration device 4 according to the above-described embodiments, the ratio between the first flow rate of the absorption solvent with a relatively low temperature flowing through the first branch portion 12a and the second flow rate of the absorption solvent with a relatively high temperature flowing through the second branch portion 12b can be regulated by the regulating part 60. As a result, the temperature T1 (temperature at the position of the first temperature sensor 71) of the absorption solvent in the downstream portion 12c downstream of the junction point between the first branch portion 12a and the second branch portion 12b, or the temperature T2 (temperature at the position of the second temperature sensor 72) of the absorption solvent downstream of the first heat exchanger 18 in the main rich solvent line 10 can be regulated. Accordingly, the temperature of a fluid (e.g., product $CO_2$) derived from the absorption solvent of the absorption solvent regeneration device 4 or a fluid (e.g., steam condensed water) which exchanges heat with the absorption solvent in the absorption solvent regeneration device 4 can be regulated.

The ratio F1/F2 may be regulated by regulating the opening degree of at least one of the first valve 14 or the second valve 15.

For example, when lowering the temperature T2 of the absorption solvent downstream of the first heat exchanger 18 in the main rich solvent line 10, the regulating part 60 (e.g., the first valve 14 and/or the second valve 15) may be controlled so as to reduce the ratio F1/F2 between the first flow rate F1 of the absorption solvent with relatively low temperature in the first branch portion 12a and the second flow rate F2 of the absorption solvent with relatively high temperature in the second branch portion 12b.

Meanwhile, for example, when rising the temperature T1 of the absorption solvent in the downstream portion 12c of the branch rich solvent line 12, the regulating part 60 (e.g., the first valve 14 and/or the second valve 15) may be controlled so as to reduce the ratio F1/F2 between the first flow rate F1 of the absorption solvent with relatively low temperature in the first branch portion 12a and the second flow rate F2 of the absorption solvent with relatively high temperature in the second branch portion 12b.

Thus, by regulating the ratio F1/F2 between the first flow rate F1 of the absorption solvent with a relatively low temperature flowing through the first branch portion 12a and the second flow rate F2 of the absorption solvent with a relatively high temperature flowing through the second branch portion 12b by the regulating part 60, the temperature of the fluid obtained from the absorption solvent regeneration device 4 can be easily regulated in a desired range.

The regulating part 60 may be configured to regulate the ratio F1/F2 between the first flow rate F1 and the second flow rate F2 as described above, and further regulate the branch flow rate (F1+F2), which is the flow rate of the absorption solvent distributed from the main rich solvent line 10 to the branch rich solvent line 12 (first branch portion 12a and second branch portion 12b).

The ratio F1/F2 and the branch flow rate (F1+F2) may be regulated by regulating the opening degree of at least one of the first valve 14 or the second valve 15.

In this case, since the flow rate of the absorption solvent distributed from the main rich solvent line 10 to the branch rich solvent line 12 can also be regulated, for example, the amount of heat exchange between the absorption solvent flowing through the downstream portion 12c of the branch rich solvent line 12 and the condensed water in the second heat exchanger 26 can be regulated more flexibly. Thus, it is possible to more flexibly regulate the temperature of the fluid (e.g., steam condensed water) obtained from the absorption solvent regeneration device 4.

In some embodiments, the regulating part 60 may be configured to regulate the ratio F1/F2 between the first flow rate F1 and the second flow rate F2 such that the temperature T3 of the tower top portion of the regenerator 6 is within a specified range. Alternatively, the regulating part 60 may be configured to regulate, as well as the ratio F1/F2, the first flow rate F1 and the second flow rate F2 such that the temperature T3 of the tower top portion of the regenerator 6 is within a specified range. The temperature of a portion of the recovery line 28, which communicates with the tower top portion, upstream of the condenser 30 (i.e., the temperature at the third temperature sensor 73) may be regarded as the temperature T3 of the tower top portion of the regenerator 6.

The regulating part 60 may regulate the ratio F1/F2, the first flow rate F1, and the second flow rate F2 by regulating the opening degree of the first valve 14 and the second valve 15 based on a detected temperature by the third temperature sensor 73 disposed in the recovery line 28 and upstream of the condenser 30.

$CO_2$ gas released from the absorption solvent heated in the regenerator 6 is recovered through the tower top portion of the regenerator 6 as a product $CO_2$. In this regard, in the above-described embodiments, since the first flow rate F1 and the second flow rate F2 and/or the ratio F1/F2 are regulated such that the temperature of the tower top portion of the regenerator 6 is within a specified range, the temperature of the product $CO_2$ recovered from the absorption solvent regeneration device 4 can be easily regulated within an appropriate range by setting these values appropriately.

In some embodiments, the regulating part 60 may be configured to regulate the ratio F1/F2 between the first flow rate F1 and the second flow rate F2 such that the temperature T2 of the absorption solvent in the main rich solvent line 10 and downstream of the second branch portion 12b is within a specified range. Alternatively, the regulating part 60 may be configured to regulate, as well as the ratio F1/F2, the first flow rate F1 and the second flow rate F2 such that the temperature T2 of the absorption solvent in the main rich solvent line 10 and downstream of the second branch portion 12b is within a specified range.

The regulating part 60 may regulate the ratio F1/F2, the first flow rate F1, and the second flow rate F2 by regulating the opening degree of the first valve 14 and the second valve 15 based on a detected temperature by the second temperature sensor 72 disposed in the main rich solvent line 10 and downstream of the second branch portion 12b.

In the regenerator 6, the absorption solvent from the main rich solvent line 10 is heated by gas-liquid contact with saturated steam, and $CO_2$ released therefrom flows into the recovery line 28 via the tower top portion. Therefore, the temperature T2 of the absorption solvent in the main rich solvent line 10 and downstream of the second branch portion 12b may serve as an index of the temperature of the tower top portion of the regenerator 6. The higher the temperature of the absorption solvent in the main rich solvent line 10, the higher the temperature of the tower top portion of the regenerator 6. In this regard, in the above-described embodiments, since the first flow rate F1 and the second flow rate F2 and/or the ratio F1/F2 are regulated such that the temperature of the absorption solvent in the main rich solvent line 10 and downstream of the second branch portion 12b is within a specified range, the temperature of the product $CO_2$ recovered from the absorption solvent regeneration device 4 can be easily regulated within an appropriate range by setting these values appropriately.

In some embodiments, the regulating part 60 may be configured to regulate the ratio F1/F2 between the first flow rate F1 and the second flow rate F2 such that the temperature T4 of the condensed water in the steam line 22 and downstream of the second heat exchanger 26 is within a specified range. Alternatively, the regulating part 60 may be configured to regulate, as well as the ratio F1/F2, the first flow rate F1 and the second flow rate F2 such that the temperature T4 of the condensed water in the steam line 22 and downstream of the second heat exchanger 26 is within a specified range.

The regulating part 60 may regulate the ratio F1/F2, the first flow rate F1, and the second flow rate F2 by regulating the opening degree of the first valve 14 and the second valve 15 based on a detected temperature by the fourth temperature sensor 74 disposed in a portion of the steam line 22 downstream of the second heat exchanger 26.

In the above-described embodiments, since the first flow rate F1 and the second flow rate F2 and/or the ratio F1/F2 are regulated such that the temperature of the condensed water in the steam line 22 and downstream of the second heat exchanger 26 is within a specified range, the temperature of the steam condensed water obtained from the absorption solvent regeneration device 4 can be easily regulated within an appropriate range by setting these values appropriately.

In some embodiments, the regulating part 60 may be configured to regulate the ratio F1/F2 between the first flow rate F1 and the second flow rate F2 such that the temperature T1 of the absorption solvent which is an upstream side more than the second heating exchanger 26 in the downstream portion 12c is within a specified range. Alternatively, the regulating part 60 may be configured to regulate, as well as the ratio F1/F2, the first flow rate F1 and the second flow rate F2 such that the temperature T1 of the absorption solvent which is an upstream side more than the second heating exchanger 26 in the downstream portion 12c is within a specified range.

The regulating part 60 may regulate the ratio F1/F2, the first flow rate F1, and the second flow rate F2 by regulating the opening degree of the first valve 14 and the second valve 15 based on a detected temperature by the first temperature sensor 71 disposed in the downstream portion 12c of the branch rich solvent line 12 and upstream of the second heat exchanger 26.

The absorption solvent in the downstream portion 12c of the branch rich solvent line 12 and upstream of the second heat exchanger 26 and the condensed water in the steam line 22 and downstream of the second heat exchanger 26 exchange heat in the second heat exchanger 26. Therefore, the temperature T1 of the absorption solvent in the downstream portion 12c and upstream of the second heat exchanger 26 may serve as an index of the temperature T4 of condensed water in the steam line 22 and downstream of the second heat exchanger 26. In this regard, in the above-described embodiments, since the first flow rate F1 and the second flow rate F2 and/or the ratio F1/F2 are regulated such that the temperature T1 of the absorption solvent in the downstream portion 12c of the branch rich solvent line 12 and upstream of the second heat exchanger 26 is within a specified range, the temperature of the steam condensed water obtained from the absorption solvent regeneration device 4 can be easily regulated within an appropriate range by setting these values appropriately.

In the exemplary embodiment shown in FIG. 2, the regulating part 60 may be configured to regulate the ratio F1/F2 between the first flow rate F1 and the second flow rate F2 such that the temperature T5 of the absorption solvent at a position of the downstream portion 12c downstream of the second heat exchanger 26 is within a specified range. Alternatively, the regulating part 60 may be configured to regulate, as well as the ratio F1/F2, the first flow rate F1 and the second flow rate F2 such that the temperature T5 of the absorption solvent at a position of the downstream portion 12c downstream of the second heat exchanger 26 is within a specified range.

The regulating part 60 may regulate the ratio F1/F2, the first flow rate F1, and the second flow rate F2 by regulating the opening degree of the first valve 14 and the second valve 15 based on a detected temperature by the fifth temperature sensor 75 disposed in the downstream portion 12c and downstream of the second heat exchanger 26.

In the reboiler outlet line 20b, depending on the flow state of the fluid including the absorption solvent (lean solvent), vibration may occur in a pipe that constitutes the reboiler outlet line 20b. For example, when the flow from the regeneration reboiler 24 is a two-phase flow of gas-liquid mixture, this flow may become a bulk flow (slug flow) or a ring flow (annular flow) depending on the ratio of gas and liquid components, flow rate, and other factors. When the flow in the pipe is a bulk flow, the pipe is likely to vibrate. In contrast, when the flow in the pipe is an annular flow, the pipe is less likely to vibrate.

In this regard, in the above-described embodiments, as well as the flow rate can be increased by flowing the absorption solvent (rich solvent) from the downstream portion 12c of the branch rich solvent line 12 to the reboiler outlet line 20b, the temperature of the absorption solvent can be regulated. Accordingly, vibration of the pipe can be effectively suppressed by effectively regulating the flow state in the reboiler outlet line 20b.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 $CO_2$ recovery device
2 Absorber
4 Absorption solvent regeneration device
6 Regenerator
8 Flue gas introduction line
10 Main rich solvent line
11 Rich solvent pump
12 Branch rich solvent line
12a First branch portion
12b Second branch portion
12c Downstream portion
14 First valve
15 Second valve
16 Lean solvent line
17 Lean solvent pump
18 First heat exchanger
20 Reboiler line
20a Reboiler inlet line
20b Reboiler outlet line
22 Steam line
24 Regeneration reboiler
26 Second heat exchanger
28 Recovery line
30 Condenser
32 Absorbing section
34 Washing section
36 Chimney tray
38 Circulation line
39 Circulation pump
40 Demister
42 Tower top portion
44 Release section
44A First release section
44B Second release section
46 Chimney tray
48 Demister
50 Flow rate sensor
51 Flow rate sensor
60 Regulating part
61 First branch point
62 Second branch point
71 First temperature sensor
72 Second temperature sensor
73 Third temperature sensor
74 Fourth temperature sensor
75 Fifth temperature sensor

The invention claimed is:

1. An absorption solvent regeneration device, comprising:
a regenerator for regenerating an absorption solvent by separating $CO_2$ from the absorption solvent which has absorbed $CO_2$;
a main rich solvent line for supplying the absorption solvent which has absorbed $CO_2$ to a first position in the regenerator;
a first heating part for heating the absorption solvent flowing through the main rich solvent line, the first heating part being disposed on the main rich solvent line; and
a branch rich solvent line for supplying a part of the absorption solvent flowing through the main rich solvent line to the regenerator, the branch rich solvent line branching from the main rich solvent line,
wherein the branch rich solvent line includes:
a first branch portion branching from a first branch point disposed on the main rich solvent line and upstream of the first heating part;
a downstream portion which is a portion downstream of a second branch portion branching from a second branch point disposed on the main rich solvent line and downstream of the first heating part; and
a junction point between the first branch portion and the second branch portion,
wherein the downstream portion is configured to supply the part of the absorption solvent to a second position in the regenerator, the second position being lower than the first position, and
wherein the absorption solvent regeneration device further comprises a regulating part for regulating a ratio between a first flow rate of the absorption solvent flowing through the first branch portion and a second flow rate of the absorption solvent flowing through the second branch portion.

2. The absorption solvent regeneration device according to claim 1,
wherein the regulating part is configured to regulate a flow rate of the absorption solvent distributed from the main rich solvent line to the branch rich solvent line.

3. The absorption solvent regeneration device according to claim 1,
wherein the regulating part includes at least one of a first valve, disposed on the first branch portion, for regulating the first flow rate or a second valve, disposed on the second branch portion, for regulating the second flow rate.

4. The absorption solvent regeneration device according to claim 1,
wherein the regulating part is configured to regulate the ratio between the first flow rate and the second flow rate such that a temperature of a tower top portion of the regenerator is within a specified range.

5. The absorption solvent regeneration device according to claim 1,
wherein the regulating part is configured to regulate the ratio between the first flow rate and the second flow rate such that a temperature of the absorption solvent in the main rich solvent line and downstream of the second branch portion is within a specified range.

6. The absorption solvent regeneration device according to claim 1,
wherein the absorption solvent regeneration device further comprises:
a regeneration reboiler for heating the absorption solvent extracted from the regenerator by heat exchange with steam;

a steam line through which steam to be supplied to the regeneration reboiler flows; and a second heating part disposed on the steam line and configured to heat the absorption solvent flowing through the downstream portion by heat exchange with condensed water of steam after heating the absorption solvent in the regeneration reboiler, wherein the regulating part is configured to regulate the ratio between the first flow rate and the second flow rate such that a temperature of the condensed water in the steam line and downstream of the second heating part is within a specified range.

7. The absorption solvent regeneration device according to claim 1, wherein the absorption solvent regeneration device further comprises:

a regeneration reboiler for heating the absorption solvent extracted from the regenerator by heat exchange with steam;

a steam line through which steam to be supplied to the regeneration reboiler flows; and a second heating part disposed on the steam line and configured to heat the absorption solvent flowing through the downstream portion by heat exchange with condensed water of steam after heating the absorption solvent in the regeneration reboiler, wherein the regulating part is configured to regulate the ratio between the first flow rate and the second flow rate such that a temperature of the absorption solvent which is an upstream side more than the second heating part in the downstream portion is within a specified range.

8. A $CO_2$ recovery device, comprising:

an absorber configured to cause $CO_2$ in a flue gas to be absorbed by an absorption solvent by bringing the flue gas containing $CO_2$ and the absorption solvent into contact; and the absorption solvent regeneration device according to claim 1, wherein the main rich solvent line is configured to supply the absorption solvent which has absorbed $CO_2$ in the absorber to the regenerator.

9. An absorption solvent regeneration method, comprising:

a step of supplying an absorption solvent which has absorbed $CO_2$ to a first position in a regenerator via a main rich solvent line;

a step of regenerating the absorption solvent by separating $CO_2$ from the absorption solvent in the regenerator;

a step of heating the absorption solvent flowing through the main rich solvent line by a first heating part disposed on the main rich solvent line; and a step of distributing a part of the absorption solvent flowing through the main rich solvent line to a branch rich solvent line branching from the main rich solvent line, wherein the branch rich solvent line includes:

a first branch portion branching from a first branch point disposed on the main rich solvent line and upstream of the first heating part;

a downstream portion which is a portion downstream of a second branch portion branching from a second branch point disposed on the main rich solvent line and downstream of the first heating part; and a junction point between the first branch portion and the second branch portion, wherein the step of distributing includes distributing a part of the absorption solvent to the first branch portion and the second branch portion, and wherein the absorption solvent regeneration method further comprising:

a step of supplying the part of the absorption solvent via the downstream portion to a second position in the regenerator, the second position being lower than the first position; and a regulating step of regulating a ratio between a first flow rate of the absorption solvent flowing through the first branch portion and a second flow rate of the absorption solvent flowing through the second branch portion.

10. The absorption solvent regeneration method according to claim 9, wherein the regulating step includes regulating a flow rate of the absorption solvent distributed from the main rich solvent line to the branch rich solvent line.

11. The absorption solvent regeneration method according to claim 9, wherein the regulating step includes regulating the first flow rate by a first valve disposed on the first branch portion or regulating the second flow rate by a second valve disposed on the second branch portion.

12. The absorption solvent regeneration method according to claim 9, wherein the regulating step includes regulating the ratio between the first flow rate and the second flow rate such that a temperature of a tower top portion of the regenerator is within a specified range.

13. The absorption solvent regeneration method according to claim 9, wherein the regulating step includes regulating the ratio between the first flow rate and the second flow rate such that a temperature of the absorption solvent in the main rich solvent line and downstream of the second branch portion is within a specified range.

14. The absorption solvent regeneration method according to claim 9, wherein the absorption solvent regeneration method further comprises:

a step of extracting the absorption solvent from the regenerator and heating the absorption solvent by heat exchange with steam in a regeneration reboiler;

a step of supplying the steam to the regeneration reboiler via a steam line; and a step of heating, in a second heating part disposed on the steam line, the absorption solvent flowing through the downstream portion by heat exchange with condensed water of steam after heating the absorption solvent in the regeneration reboiler, wherein the regulating step includes regulating the ratio between the first flow rate and the second flow rate such that a temperature of the condensed water in the steam line and downstream of the second heating part is within a specified range.

15. The absorption solvent regeneration method according to claim 9, wherein the absorption solvent regeneration method further comprises:

a step of extracting the absorption solvent from the regenerator and heating the absorption solvent by heat exchange with steam in a regeneration reboiler;

a step of supplying the steam to the regeneration reboiler via a steam line; and a step of heating, in a second heating part disposed on the steam line, the absorption solvent flowing through the downstream portion by heat exchange with condensed water of steam after heating the absorption solvent in the regeneration reboiler, wherein the regulating step includes regulating the ratio between the first flow rate and the second flow rate such that a temperature of the absorption solvent which is an upstream side more than the second heating part in the downstream portion is within a specified range.

* * * * *